United States Patent [19]
Starks

[11] 3,888,931
[45] June 10, 1975

[54] PREPARATION OF ALKYL VINYL ETHERS

[75] Inventor: Charles M. Starks, Ponca City, Okla.

[73] Assignee: Continental Oil Company, Ponca City, Okla.

[22] Filed: Aug. 10, 1972

[21] Appl. No.: 279,571

Related U.S. Application Data

[63] Continuation-in-part of Ser. No. 97,301, Dec. 11, 1970, abandoned, which is a continuation-in-part of Ser. No. 807,092, March 13, 1969, abandoned.

[52] U.S. Cl. ........................ 260/611 A; 260/614 R
[51] Int. Cl. ............................................. C07c 41/00
[58] Field of Search........ 260/614 R, 611 A, 612 D, 260/611 R; 97/301

[56] References Cited
UNITED STATES PATENTS

| | | | |
|---|---|---|---|
| 1,941,108 | 12/1933 | Reppe | 260/614 R |
| 2,360,301 | 10/1944 | Emerson | 260/611 A X |
| 2,643,270 | 6/1953 | Ross | 260/611 A |

*Primary Examiner*—Bernard Helfin
*Attorney, Agent, or Firm*—Ronald J. Carlson

[57] ABSTRACT

A mono-alcohol is reacted with an olefinic halide, wherein the halogen is attached to an olefinic carbon, in the presence of a strong base thereby forming alkyl alkenyl ethers.

8 Claims, No Drawings

PREPARATION OF ALKYL VINYL ETHERS

This is a continuation-in-part of Application Ser. No. 97,301, filed Dec. 11, 1970, which in turn was a continuation-in-part of application Ser. No. 807,092, filed Mar. 13, 1969, both now abandoned.

This invention relates to a method for making vinyl ethers.

Alkyl or aryl vinyl ethers are of significant commercial value as monomers and co-monomers with other vinyl compounds and are particularly useful as co-monomers with vinyl chloride. Such ethers are also well-known mold release agents.

It is well-known in the chemical literature that ethers can be prepared by the "Williamson Reaction" which involves the reaction of alcohols with alkyl halides in the presence of a base, e.g.:

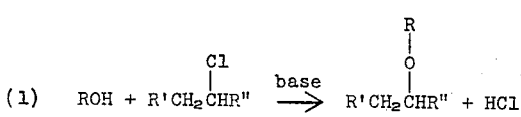

U.S. Pat. Nos. 2,042,219 and 2,079,758 show similar ether formations using an unsaturated hydrocarbon halide, e.g.:

(2)   ROH + RCH$_2$—CX=CH—CH$_2$X' $\xrightarrow{base}$ RCH$_2$CX=CH—CH$_2$OR + HX' wherein X and X' are halogens.

It is well-known that these reactions follow the mechanistic course of nucleophilic displacement in which a variety of nucleophiles (such as amines, thiols, and a variety of anions such as CN$^-$, acetate, halide, etc) can be substituted for the alcohol in equations 1 and 2 to obtain the corresponding derivatives. It is to be noted the halogen, etc, substituted is on a saturated carbon atom. Note, for example, equation 2 wherein the halogen on the olefinic carbon is untouched, that is the RO group enters the molecule at the saturated carbon which previously held the halide substituent.

Reppe in U.S. Pat. No. 1,940,108 shows a somewhat similar substitution with certain vinyl compounds and particularly vinyl chloride. Even here it is indicated the substitution is on the carbon atom having the Cl substituent.

It was quite unexpected, therefore, to find that alkyl alkenyl ethers could be formed by substitution of the ether moiety on the unsaturated carbon atom adjacent the carbon atom containing the halogen.

An object of this invention is to provide a simple method for producing alkyl alkenyl ethers.

Other objects and advantages of the invention will be apparent to those skilled in the art from the following description and examples.

According to this invention an unsaturated hydrocarbon having a halogen substituent on a vinylitic carbon atom is reacted with a mono-alcohol in the presence of a strong base to form alkyl vinyl ethers.

The unsaturated hydrocarbon compounds which are useful starting materials in my process are of the following general formula:

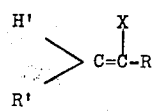

wherein X is a halogen, R and R' can be hydrogen alkyl, alkenyl, aryl or alkaryl radicals which may be further substituted, provided that only one of R or R' may be hydrogen and when R and R' are of the same type radical they must have different carbon atoms therein, e.g., the hydrocarbon is nonsymmetrical with respect to the vinyl unsaturation. The unsaturation must be vinylic, and one of the carbon atoms must have a halogen substituent. Unlike the Williamson reaction, the alcohol attaches to the unsubstituted halogen carbon, e.g.:

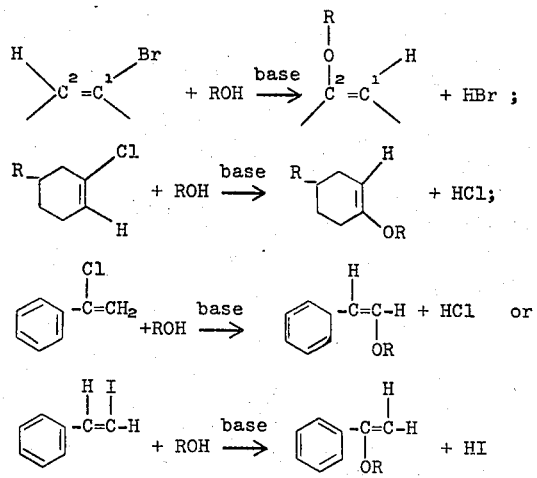

The aromatic can be either hydrocarbon or heterocyclic, and it is obvious that other noninterfering substituents can be on the hydrocarbon moiety. The number of carbon atoms in the unsaturated hydrocarbons (which I include nonreactive substituents) is immaterial so long as the hydrocarbon is liquid or gaseous at the reaction pressure. The aliphatic unsaturated hydrocarbons usually contain 3 to 10 carbon atoms. It is also preferred that the unsaturation be in the terminal position with the halogen attached to the terminal carbon. The cyclic hydrocarbons can be polynuclear and can have alkyl substituents preferably of not over 2 carbon atoms; however, the preferred cyclic hydrocarbon will be styrene and methyl substituted cyclohexene wherein the halogen is on a vinylic carbon. Thus the halogenated hydrocarbons include 2-chlorostyrene; 1-chlorobutadiene; 1-chloropropene-1; 2-chlorohexene-2; 2-methyl-1-chlorobutene-1; methyl-3-cyclohexene-3 and the like. Also included would be corresponding bromine, iodine and fluorine compounds. The chloro-substituent is preferred.

The alcohols which are useful in this invention can be primary or secondary mono-alcohols. As in the case of the vinyl compounds, it is only necessary that they not be solid at the reaction conditions. Preferably, I like aliphatic 1-ols of 1 to 30 carbon atoms and, more preferably, n-1-ols of 1 to 18 carbon atoms. Alcohols suitable in my invention include methanol, ethanol, hexanol-1, octanol-1, dodecanol-1, eicosanol-1; triacontanol-1, 3-butyloctanol-1, 3-pentyl-5-butyldodecanol-1 and the like. Also included are secondary alcohols such as secondary butanol; secondary pentanol; 3-dodecanol; 8-octadecanol; 6-propyldocosanol-4; 4-butylpentacosanol-6; 3-pentyl-5-ethyl-tricosanol-3 and the like.

The catalyst useful in my invention is a strong base. By strong base I means a base which is stronger than ammonium hydroxide and preferably as strong as NaOH. Such preferred catalyst then includes NaOH, KOH, LiOH and quaternary ammonium hydroxide.

The reaction conditions are preferably at a temperature of 150° to 400°C, and the pressure will preferably be the autogeneous pressure of the reaction.

It should be understood that the reaction of this invention is not the same as the classical Williamson reaction. Thus, if one reacts 1-hexanol with 1-chloropropene, one obtains 2-hexoxy propene and not 1-hexoxy propene as would be expected by the Williamson mechanism.

To further illustrate the invention, the following runs were made.

EXAMPLE 1

A mixture of 123 g di-n-butylamine, 31 g vinyl chloride and 0.5 g di-t-butylphenol was charged to the autoclave. The autoclave was heated to 180°C for two hours and at 250°C for two more hours. Gas chromatographic analysis of the product showed it to be identical to that of the starting mixture, confirming the fact that no reaction had taken place. The absence of a pressure change during the course of the reaction also indicated that no reaction had taken place.

EXAMPLE 2

The experiment of Example 1 was repeated, except that 73 g of pyrolidine was substituted for the di-n-butylamine. No reaction took place.

EXAMPLE 3

1-Hexanol (0.5 mol), sodium hydroxide (0.55 mol), 1-chloropropene (0.5 mol), and 0.5 g of 2,6-di-t-butylphenol were charged to a 300 ml autoclave. The autoclave and its contents were heated to 180°C for 2 hours. The reaction mixture was removed and filtered. Analysis of the filtrate by gas chromatography, NMR and IR spectra, showed it to be 2-hexoxy propene; e.g.:

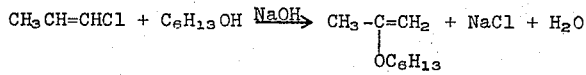

There was no evidence of 1-hexoxy propene being formed; therefore, the alkoxy group enters the molecule at the vinylic carbon atom not containing the chlorine atom as would be expected if the reaction followed the Williamson synthesis mechanism.

EXAMPLE 4

Equimolar portions of butanol and alpha-chlorostyrene along with potassium hydroxide are charged to an autoclave and heated to 150°C for 3 hours. The product is recovered and analyzed as in the above example. The reaction was as follows:

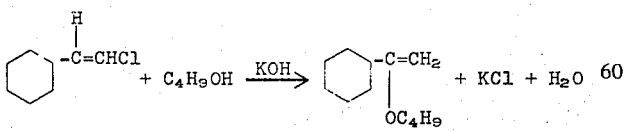

EXAMPLE 5

8-butyl-6-ethyl-tetradecanol-4 and 1-bromobutadiene in equal molar proportions and LiOH are charged to an autoclave and heated to 250°C for 1 hour. The reaction is:

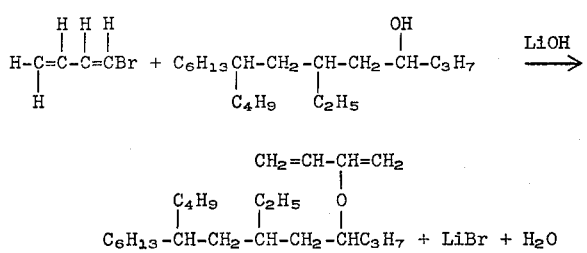

Those skilled in the art will readily recognize various modifications which can be made.

Having thus described the invention, I claim:
1. A process for forming vinyl ethers of the formula

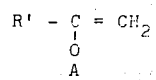

wherein
  R' is alkyl, alkenyl, aryl or an alkaryl radical; and
  A is an aliphatic $C_1$–$C_{30}$ hydrocarbon radical; which comprises reacting (1) a halogen-substituted hydrocarbon having the general formula
  R' — CH = CHX
wherein R' is as defined above, and X is halogen, with (2) a primary or secondary alcohol represented by AOH wherein A is as defined, in the presence of a base stronger than ammonium hydroxide at autogeneous pressures and temperatures in the range of 150°C to 400°C.

2. The process of claim 1 wherein the base is at least as strong as sodium hydroxide.

3. The process of claim 1 the halogen substituted hydrocarbon has 3 to 10 carbon atoms.

4. The process of claim 1 wherein the alcohol has 1 to 12 carbon atoms.

5. The process of claim 4 wherein the halogen is chlorine.

6. The process of claim 4 wherein the halogen substituted hydrocarbon is 1-chloropropene-1 or alpha-chlorostyrene.

7. The process of claim 6 wherein the alcohol is methanol or 1-hexanol.

8. The process of claim 3 wherein the halogen substituted hydrocarbon is aliphatic.

* * * * *